United States Patent [19]

Adachi et al.

[11] Patent Number: 5,663,618
[45] Date of Patent: Sep. 2, 1997

[54] DRIVING APPARATUS FOR A COMMUTATORLESS DC MOTOR

[75] Inventors: Tsuneo Adachi; Yoriyuki Takekawa, both of Higashimatsuyama, Japan

[73] Assignee: Zexel Corporation, Tokyo, Japan

[21] Appl. No.: 412,413

[22] Filed: Mar. 24, 1995

[30] Foreign Application Priority Data

Mar. 30, 1994 [JP] Japan .................................. 6-085668
Apr. 4, 1994 [JP] Japan .................................. 6-090641

[51] Int. Cl.$^6$ ............................................. H02P 5/28
[52] U.S. Cl. ....................... 318/254; 318/439; 318/498
[58] Field of Search .................................. 318/254, 439, 318/138, 500, 494, 496, 498

[56] References Cited

U.S. PATENT DOCUMENTS

| | | | |
|---|---|---|---|
| 5,057,753 | 10/1991 | Leuthold et al. | 318/138 |
| 5,177,416 | 1/1993 | Iraji et al. | 318/254 |
| 5,182,499 | 1/1993 | Inaji et al. | 318/254 |
| 5,202,616 | 4/1993 | Peters et al. | 318/254 |
| 5,397,972 | 3/1995 | Maiocchi | 318/439 |

FOREIGN PATENT DOCUMENTS

58-25038  5/1983  Japan .
61-3193   1/1986  Japan .

*Primary Examiner*—John W. Cabeca

[57] ABSTRACT

A driving apparatus for a commutatorless DC motor decides a next commutation period based on a difference of a reference zero-cross time and an actual zero-cross time such that a rising or falling edge of induced voltage signals is generated at the reference zero-cross time. Rising and falling edges of the induced voltage signals represent zero-cross points of induced voltages that are generated at each phase of drive windings. The actual zero-cross time is an actual time width from a start of a current commutation period till the generation of a rising or falling edge of the induced voltage signals. The reference zero-cross time is a desirable time width from the start of the current commutation period until a rising or falling edge of the induced voltage signals should be generated. The driving apparatus calculates an integrated value of the next commutation period by an integral computation based on the difference and an integrated value of the current commutation period, and decides the next commutation period by a proportional computation based on the difference and the integrated value of the next commutation period. Driving current of each phase of the drive windings is commutation controlled based on the decided commutation period.

19 Claims, 10 Drawing Sheets

DRIVING APPARATUS FOR A COMMUTATORLESS DC MOTOR

BACKGROUND OF THE INVENTION

The present invention relates to a driving apparatus for a commutatorless DC motor.

The Japanese Patent Publication No. 61-3193 (the Japanese Patent Application No. 50-87617) discloses a commutatorless DC motor having an armature winding with a fixed three-phase Y connection, a permanent magnet rotor, semiconductor switching unit for controlling a commutation of an armature current of the armature winding, and a pulse generating circuit for on-off controlling the semiconductor switching unit based on induced voltages which are generated at each phase of the armature winding. The semiconductor switching unit is composed of six switching transistors connected by a three-phase bridge connection. The six switching transistors are on-off controlled by the pulse generating circuit, and they switch the armature current flowing through the armature winding. The pulse generating circuit has a circuit for forming a pulse signal which represents a zero-cross point of the induced voltages by means of pulse shaping and logically calculating the induced voltages of the armature winding, a PLL (Phase Locked Loop) circuit for inputting the pulse signal which represents the zero-cross point of induced voltages, and a circuit for forming six drive pulse signals for controlling the semiconductor switching unit based on an output from the PLL circuit. The PLL circuit has a voltage-controlled oscillator, a ½ frequency divider for ½ frequency dividing an output of the voltage-controlled oscillator, a phase comparator for inputting an output of the ½ frequency divider and the pulse signal representing the zero-cross point of induced voltages, and a low-pass filter for feeding back an output of the phase comparator to the voltage-controlled oscillator. The PLL circuit detects a phase difference between the output of the ½ frequency divider and the pulse signal representing the zero-cross point of induced voltages, feeds it back to the voltage-controlled oscillator through the low-pass filter, and gives a pulse output signal which has a 90° phase difference in relation to the pulse signal representing the zero-cross point of induced voltages.

The pulse generating circuit forms three drive pulses out of six drive pulses by means of ⅓ frequency dividing the pulse output signal of the PLL circuit and, forms the remaining three drive pulses by means of ⅓ frequency dividing the pulse output signal of the PLL circuit after inverting its phase. Using these six pulse signals, the pulse generating circuit on-off controls each of the six switching transistors of the semiconductor switching unit.

According to the commutatorless DC motor with the above-mentioned arrangement, since the phase difference between the pulse output signal of the PLL circuit and the pulse signal representing the zero-cross point of induced voltages is detected and the phase difference is fed back to the voltage-controlled oscillator through the low-pass filter, a commutation timing of the armature current is adjusted only by the result of integrating the phase difference. Thereby, in cases where the phase difference is large such as a shift to running based on the induced voltages from synchronized operation at a starting of the motor and an overloading, a response time until the voltage-controlled oscillator follows the output of the phase comparator is extended, and in certain cases the voltage-controlled oscillator can not follow, causing the motor step-out. Moreover, according to the commutatorless DC motor with the above-mentioned arrangement, since the pulse output signal of the PLL circuit and the pulse signal representing the zero-cross point of induced voltages are controlled so that the phase difference is always 90°, it is not easily possible to change the commutation timing. If the commutation timing can easily be changed, it is possible to selectively change the commutation timing corresponding to variations in revolution and the load of the motor, whereby the commutatorless DC motor can be driven more stably.

Furthermore, in the commutatorless DC motor, spike voltages are generated in the armature winding when commutating the armature current, that is, when switching the armature current. The spike voltages are superposed on the induced voltages of each phase of the armature winding. The spike voltages remain after the induced voltages are pulse shaped and cause an adverse effect on the detection of the zero-cross point of induced voltages. In the Japanese Patent Publication No. 58-25038 (the Japanese Patent Application No. 50-105932), the induced voltages superposed with spike voltages are each integrated in the integration circuit, the integrated outputs are each compared with a ground voltage and pulse shaped, and six drive pulse signals for controlling a commutation are formed from the pulse-shaped integrated outputs through a logic circuit. Thereby, since both the induced voltages and spike voltages are integrated together, an error is generated in the position of the zero-cross point of induced voltages. Hence, there is a problem that the motor's stable driving is impeded.

SUMMARY OF THE INVENTION

It is an object of the present invention to provide an improved driving apparatus for a commutatorless DC motor.

Another object of the present invention is to provide a driving apparatus which can improve followability, responsiveness and stability in driving.

Still another object of the present invention is to provide a driving apparatus which can freely change the commutation timing.

Still another object of the present invention is to provide a driving apparatus which can accurately detect a zero-point of induced voltages without being affected by spike voltages.

The above and other objects are attained by a driving apparatus for a commutatorless DC motor, having drive windings of a three-phase Y connection, a permanent magnet rotor and semiconductor switching means for commutating a driving current of said drive windings, and giving commutation control signals for on-off controlling said semiconductor switching means based on induced voltages which are generated at each phase of said drive windings by rotation of said permanent magnet rotor, comprising: signal generating means, responsive to said induced voltages, for generating pulse-shaped induced voltage signals based on a comparison of said induced voltages and a neutral point potential of said drive windings; commutation period counting means for counting a current commutation period, said commutation period counting means, when a counting of the current commutation period is finished, starting a counting of a next commutation period; actual zero-cross time detecting means, responsive to said signal generating means and said commutation period counting means, for detecting an actual zero-cross time which represents an actual time width from a start of the current commutation period till a generation of a rising or falling edge of said induced voltage signals; reference zero-cross time setting means, responsive to said signal generating means, for setting a reference zero-cross time which represents a desirable time width from the start of the current commutation period until the rising or falling edge of said induced voltage signals should be generated; commutation period deciding means, responsive to said actual zero-cross time detecting means and said reference zero-cross time setting means, for deciding the next commutation period such that the rising or falling edge of said induced voltage signals is generated at said reference zero-cross time based on a difference of said reference zero-cross time and said actual zero-cross time, said commutation period deciding means calculating an integrated value of said next commutation period by an integral computation based on said difference and an integrated value of said current commutation period, and deciding said next commutation period by a proportional computation based on said difference and the integrated value of said next commutation period, and further, said commutation period deciding means giving said next commutation period to said commutation period counting means and said reference zero-cross time setting means; and commutation control signal supplying means, responsive to said signal generating means and said commutation period counting means, for deciding new commutation control signals corresponding to a state of said induced voltage signals, and giving said new commutation control signals to said semiconductor switching means when finishing the counting of the current commutation period.

According to the construction like this, by means of an integral control and a proportional control corresponding to the difference of the reference zero-cross time at which the rising or falling edge of the induced voltage signals should be generated and the actual zero-cross time at which the rising or falling edge of the induced voltage signals is actually generated, the next commutation period is decided so that the rising or falling edge of the induced voltage signals is generated at the reference zero-cross time. Accordingly, the commutation period is adjusted proportionally not only to the integrated result of the difference of the actual zero-cross time and the reference zero-cross time but also to the difference itself of the actual zero-cross time and the reference zero-cross time. Thus, even in cases where the difference of the actual zero-cross time and the reference zero-cross time is large, that is, where the phase difference is large, it is possible to follow the phase difference in good response. Moreover, since the reference zero-cross time is set by a time width to the j-th of the equally divided k parts of the current commutation period, it is possible to easily change the commutation timing by changing the j and/or the k.

The above and other objects are also attained by a commutatorless DC motor drive unit, having drive windings with a three-phase Y connection, a permanent magnet rotor and semiconductor switching means for commutating a driving current of said drive windings, for giving commutation control signals for on-off controlling said semiconductor switching means based on induced voltages which are generated at each phase of said drive windings by rotation of said permanent magnet rotor, comprising: a driving apparatus for a commutatorless DC motor, having a drive windings of a three-phase Y connection, a permanent magnet rotor and semiconductor switching means for commutating a driving current of said drive windings, and giving commutation control signals for on-off controlling said semiconductor switching means based on induced voltages which are generated at each phase of said drive windings by rotation of said permanent magnet rotor, comprising: signal generating means, responsive to said induced voltages, for generating pulse-shaped induced voltage signals based on a comparison of said induced voltages and a neutral point potential of said drive windings; commutation period counting means for counting a current commutation period, said commutation period counting means, when a counting of the current commutation period is finished, starting a counting of a next commutation period; actual zero-cross time detecting means, responsive to said signal generating means and said commutation period counting means, for detecting an actual zero-cross time which represents an actual time width from a start of the current commutation period till a generation of a rising or falling edge of said induced voltage signals, said actual zero-cross time detecting means recognizing the last rising or falling edge as a true rising or falling edge of said induced voltage signals, in rising and falling edges which are generated between the start of said current commutation period and an end thereof, and said actual zero-cross time detecting means detecting a time width between the start of said current commutation period and the true rising or falling edge as said actual zero-cross time; reference zero-cross time setting means, responsive to said signal generating means, for setting a reference zero-cross time which represents a desirable time width from the start of the current commutation period until the true rising or falling edge of said induced voltage signals should be generated; commutation period deciding means, responsive to said actual zero-cross time detecting means and said reference zero-cross time setting means, for deciding the next commutation period such that the true rising or falling edge of said induced voltage signals are generated at said reference zero-cross time based on a difference of said reference zero-cross time and said actual zero-cross time, said commutation period deciding means calculating an integrated value of said next commutation period by an integral computation based on said difference and an integrated value of said current commutation period, and deciding said next commutation period by a proportional computation based on said difference and the integrated value of said next commutation period, and further, said commutation period deciding means giving said next commutation period to said commutation period counting means and said reference zero-cross time setting means; and commutation control signal supplying means, responsive to said signal generating means and said commutation period counting means, for deciding new commutation control signals corresponding to a state of said induced voltage signals, and giving said new commutation control signals to said semiconductor switching means when the counting of the current commutation period is finished.

According to the composition like this, the last rising or falling edge of the induced voltage signals is recognized as the true rising or falling edge, in rising and falling edges which are generated between the start and end of the current commutation period. And, a time width from the start of the current commutation period to the true rising or falling edge of the induced voltage signals is detected as the actual zero-cross time. A spike voltage is generated prior to the true rising or falling edge of the induced voltage signals. Thus, it is possible to detect the time width till the true rising or falling edge of the induced voltage signals as the actual zero-cross time, without being affected by the spike voltage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and attended advantages of the present invention will be appreciated as the same become better understood by means of the following description and accompanying drawings wherein.

DETAILED DESCRIPTION OF THE PREFERRED EMBODIMENTS

Figure 1:
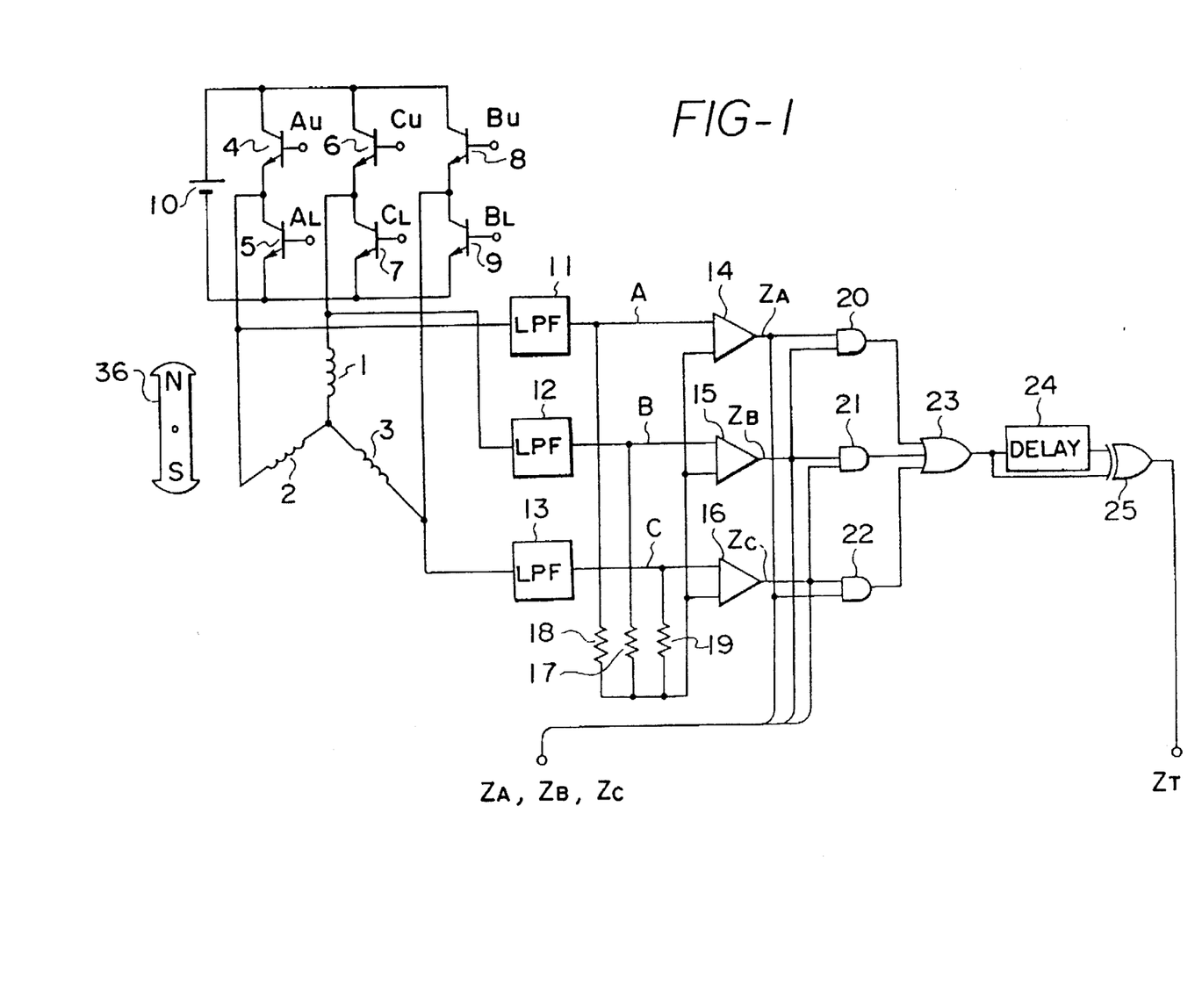
FIG. 1 and FIG. 2 are block diagrams showing a first embodiment of the present invention.
Figure 2:
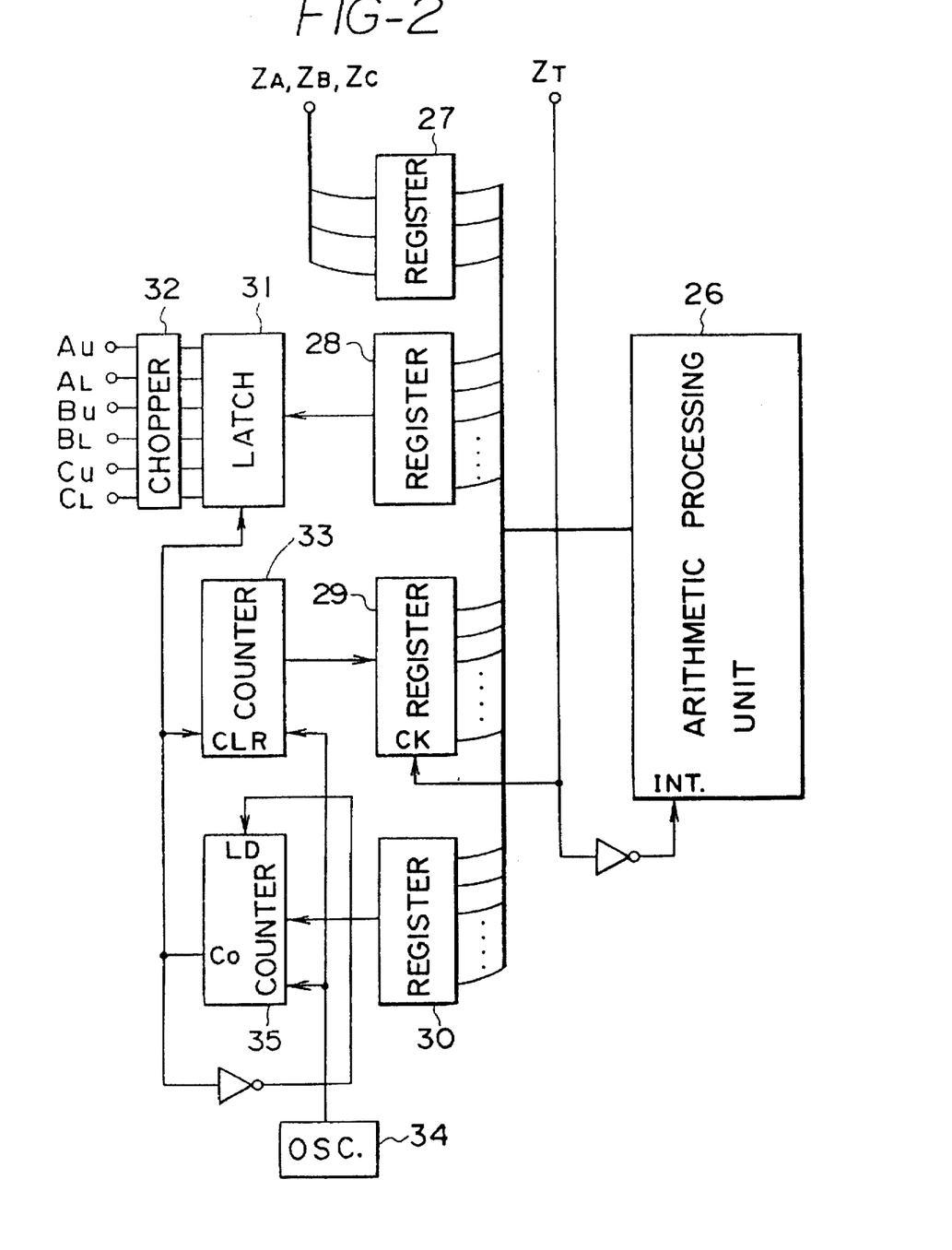
Figure 3:
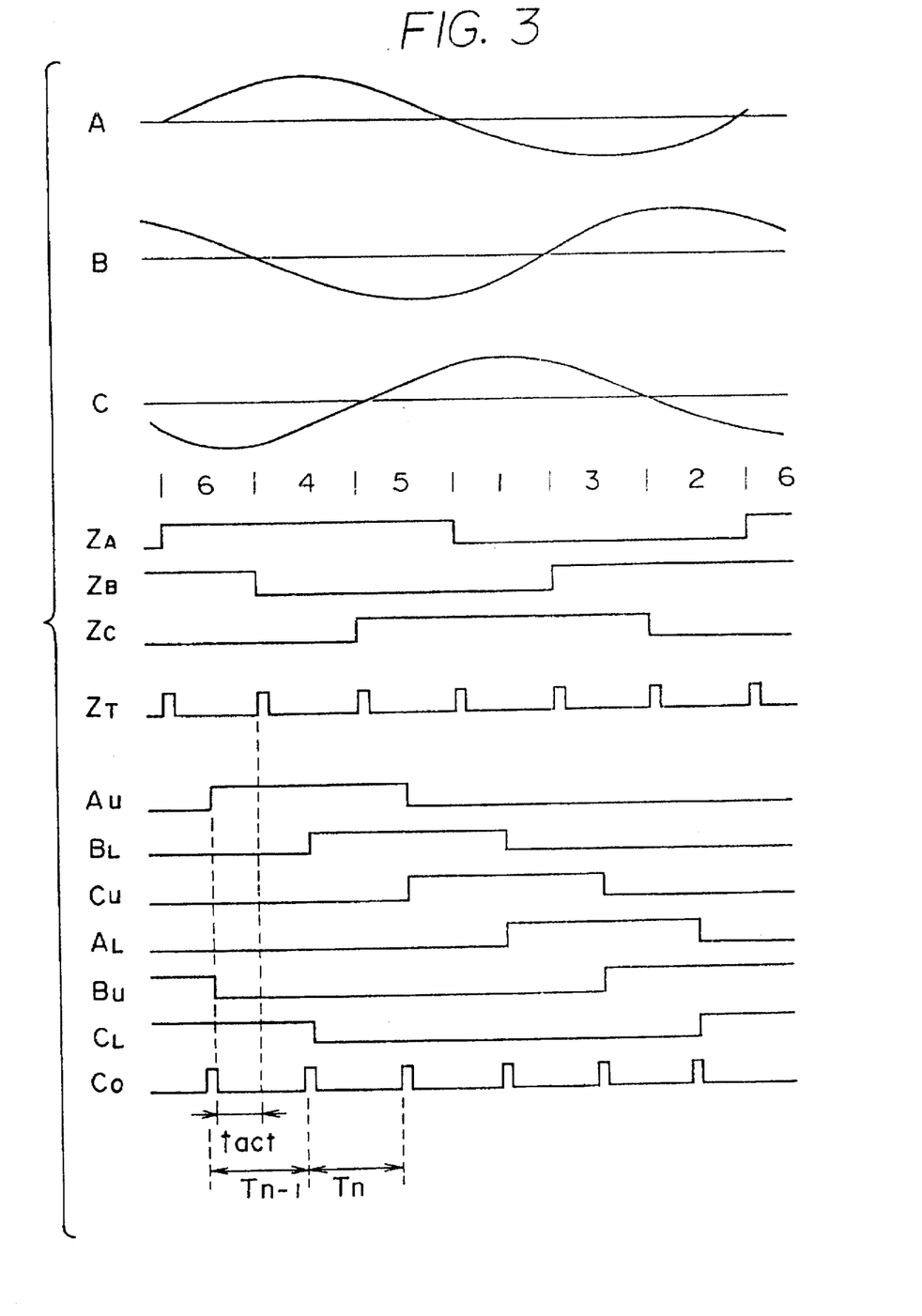
FIG. 3 is a waveform chart illustrating signals of each part in FIG. 2.

FIG. 1 and FIG. 2 are block diagrams showing the first embodiment of the present invention. The block diagram of FIG. 2 shows the device receiving induced voltage signals $Z_A$, $Z_B$, $Z_C$ and a zero-cross pulse signal $Z_T$ of FIG. 1. FIG. 3 is a waveform chart illustrating signals of each part in FIG. 1 and FIG. 2.

In FIG. 1, reference numerals 1, 2 and 3 are drive windings of a commutatorless DC motor. Drive windings 1–3 form a three-phase Y connection. The drive windings 1–3 are fixed to the motor. A reference numeral 36 is a permanent magnet rotor of the commutatorless DC motor. Reference numerals 4, 5, 6, 7, 8 and 9 are switching transistors for controlling a commutation of driving currents of the drive windings 1–3. The switching transistors 4–9 are a three-phase bridge connection, and a power source 10 is impressed to a collector-emitter circuit of the three-phase bridge connection. The switching transistors 4–9 at their bases receive commutation control signals $A_U$, $A_L$, $C_U$, $C_L$, $B_U$ and $B_L$. The switching transistors 4–9 are on-off controlled according to the commutation control signals $A_U$, $A_L$, $C_U$, $C_L$, $B_U$ and $B_L$. By this, the driving currents of the drive windings 1–3 commutate, and the permanent magnet rotor 36 rotates.

When the permanent magnet rotor 36 is rotating, induced voltages A, B and C are generated from the drive windings 1–3 through low-pass filters 11, 12 and 13. In this embodiment, since the commutation control signals $A_U$–$B_L$ are given after being chopped by a PWM (Pulse-width Modulation), the low-pass filters 11–13 are inserted to dampen the PWM components of the induced voltages A–C. Reference numerals 14, 15 and 16 are comparators. The comparators 14–16 input the induced voltages A–C and a neutral point potential, and output the pulse-shaped induced voltage signals $Z_A$, $Z_B$ and $Z_C$. The neutral point potential is given by resistors 17, 18 and 19 which constitute a virtual neutral point of the drive windings 1–3. The induced voltages $Z_A$–$Z_C$ at their rising and falling edges represent a zero-cross point of the induced voltages A–C. The induced voltage signals $Z_A$–$Z_C$ are given to a logic circuit which is composed of AND circuits 20, 21 and 22, an OR circuit 23, a delay circuit 24 and an EX-OR (Exclusive OR) circuit, and are given to a construction of FIG. 2. The logic circuit gives a zero-cross pulse signal $Z_T$, which represents a zero-cross point of the induced voltage signals $Z_A$–$Z_C$, to the construction of FIG. 2.

In FIG. 2, a reference numeral 26 is an arithmetic processing unit. The arithmetic processing unit 26 is connected to a first input register 27, a first output register 28, a second input register 29 and a second output register 30. The first input register 27 input the induced voltage signals $Z_A$–$Z_C$, and as requested, gives them to the arithmetic processing unit 26. The first output register 28 stores the commutation control signals $A_U$–$C_L$ ($A_U$, $A_L$, $B_U$, $B_L$, $C_U$, $C_L$) from the arithmetic processing unit 26. The first output register 28 is connected to a latch circuit 31. When a carry-out signal $C_O$ is given to the latch circuit 31, the latch circuit 31 gives the commutation control signals $A_U$–$C_L$ which are stored in the first output register 28, through a chopper circuit 32, to the switching transistors 4–9 of of FIG. 1. The chopper circuit 32, chopping by PWM the commutation control signals $A_U$–$C_L$, outputs the control signals to the switching transistors 4–9. When the zero-cross pulse signal $Z_T$ is generated, the second input register 29 takes in a count value of a first counter 33. The second input register 29 stores the count value of the first counter 33 as an actual zero-cross time $t_{act}$, and as requested, gives it to the arithmetic processing unit 26. The first counter 33 counts a clock pulse of an oscillator 34. The first counter 33, when the carry-out signal $C_O$ is input, clears a previous value and newly starts counting. The carry-out signal $C_O$, as will be described hereinafter, is generated when the counting of a new commutation period is started after the counting of a previous commutation period is finished. Accordingly, the actual zero-cross time $t_{act}$ represents an actual time from the start of commutation until the zero-cross pulse signal $Z_T$ is given. The second output register 30 stores the commutation period from the arithmetic processing unit 26. The second output register 30 is connected to a second counter 35. The second counter 35 takes in the commutation period of the second output register 30, and counts the commutation period following the clock pulse of the oscillator 34. The second counter 35, when finishing the counting of the commutation period, gives the carry-out signal $C_O$ to the latch circuit 31 and the first counter 33, and to its load terminal. The second counter 35, when the carry-out signal $C_O$ is given to the load terminal, disables the carry-out signal $C_O$, and, taking in a new commutation period that is stored in the second output register 30, starts counting it.

The arithmetic processing unit 26 has the following functions. The arithmetic processing unit 26 sets a reference zero-cross time $t_{ref}$ that represents a desirable time at which the zero-Cross pulse signal $Z_T$ should be generated after commutation is started.

$$t_{ref} = (j/k) \cdot T_{n-1}$$

In the formula mentioned above, $(j/k) \cdot T_{n-1}$ represents a time width to the j-th of the equally divided k parts of a current commutation period $T_{n-1}$. The arithmetic processing unit 26 calculates a difference $\Delta t_{n-1}$ of the reference zero-cross time $t_{ref}$ and the actual zero-cross time $t_{act}$.

$$\Delta t_{n-1} = t_{ref} - t_{act}$$

The arithmetic processing unit 26 calculates an integrated value Tin of a next commutation period based on the difference $\Delta t_{n-1}$ and an integrated value $T_{in-1}$ of the current commutation period.

$$T_{in} = K_i \cdot \Delta t_{n-1} + T_{in-1}$$

In the formula mentioned above, $K_i$ is an integration constant. The arithmetic processing unit 26 calculates the next commutation period Tn based on the difference $\Delta t_{n-1}$ and the integrated value Tin of the next commutation period.

$$T_n = K_p \cdot \Delta t_{n-1} + T_{in}$$

In the formula mentioned above, $K_p$ is a proportional constant. Moreover, the arithmetic processing unit 26 assigns either "0" or "1" to the commutation control signals AU–CL according to a state of the induced voltage signals ZA–ZC. The arithmetic processing unit 26 inputs the zero-cross pulse signal ZT as an interrupt signal. When the zero-cross pulse signal ZT is generated, the arithmetic processing unit 26 decides the next commutation period Tn based on the difference $\Delta t_{n-1}$ of the reference zero-cross time tref and the actual zero-cross time tact so that the zero-cross pulse signal ZT is generated at the reference zero-cross time tref, assigns either "0" or "1" to the commutation control signals AU–CL according to the state of the induced voltage signals ZA–ZC.

Figure 4:
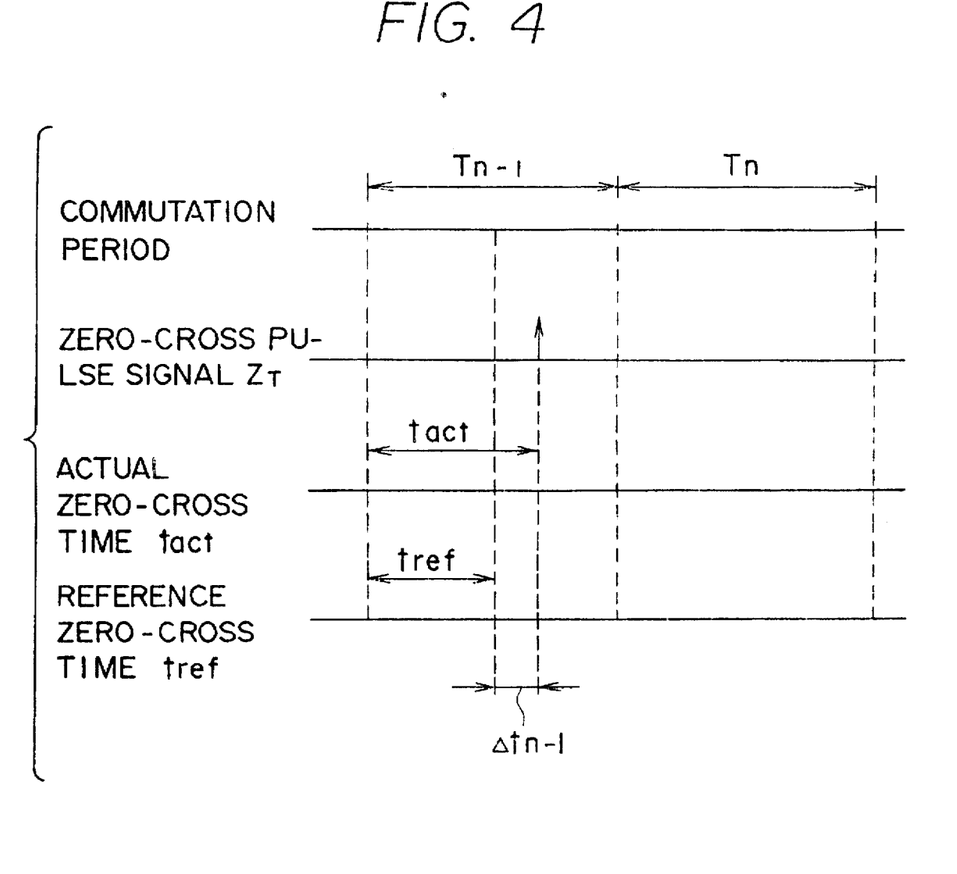
FIG. 4 is a diagram for explaining a commutation period decision involved in FIG. 1 and FIG. 2.

FIG. 4 is an explanatory drawing for explaining the decision of determining a commutation period. The reference zero-cross time tref is set based on the current commutation period Tn–1. The reference zero-cross time tref represents a desirable time width from the start of the current commutation period Tn–1 until the zero-cross pulse signal ZT should be generated. In this embodiment, j=1 and k=2, and the reference zero-cross time tref is ½·Tn–1. That is, the reference zero-cross time tref is set so that the zero-cross pulse signal ZT is generated at the center of the current commutation period Tn–1. The actual zero-cross time tact is a time width after the start of the current commutation period Tn–1 until the zero-cross pulse signal ZT is actually given. The actual zero-cross time tact is given from the second input register 29. The difference $\Delta t_{n-1}$ of the reference zero-cross time tref and the actual zero-cross time tact is calculated. The next commutation period Tn is decided according to the difference $\Delta t_{n-1}$ so that the zero-cross pulse signal ZT is generated at the reference zero-cross time tref. That is, the integrated value Tin of the next commutation period Tn is calculated by an integral computation based on the difference $\Delta t_{n-1}$ and the integrated value $T_{in-1}$ of the current commutation period Tn–1, and the next commutation period Tn is calculated by a proportional computation based on the difference $\Delta t_{n-1}$ and the integrated value Tin of the next commutation period Tn. The next commutation period Tn is given from the arithmetic processing unit 26 to the second output register 30.

The arithmetic processing unit 26 assigns either "0" or "1" to the commutation control signals AU–CL according to the state of the induced voltage signals ZA–ZC. The induced voltage signals ZA–ZC have a first state to a sixth state, as shown in FIG. 3. The first state is ZA–ZC=(0, 0, 1), the second stat is ZA–ZC=(0, 1, 0), the third state is ZA–ZC=(0, 1, 1), the fourth state is ZA–ZC=(1, 0, 0), the fifth state is ZA–ZC=(1, 0, 1), and the sixth state is ZA–ZC=(1, 1, 0). When the induced voltage signals ZA–ZC are in the first state, the commutation control signals AU–CL are, AU=0, BL=0, CU=1, AL=1, BU=0, CL=0. When the induced voltage signals ZA–ZC are in the second state, the commutation control signals AU–CL are, AU=0, CL=0, CU=0, AL=0, BU=1, CL=1. When the induced voltage signals ZA–ZC are in the third state, the commutation control signals AU–CL are, AU=0, CL=0, CU=0, AL=1, BU=1, CL=0. When the induced voltage signals ZA–ZC are in the fourth state, the commutation control signals AU–CL are, AU=1, CL=1, CU=0, AL=0, BU=0, CL=0. When the induced voltage signals ZA–ZC are in the fifth state, the commutation control signals AU–CL are, AU=0, CL=1, CU=1, AL=0, BU=0, CL=0. When the induced voltage signals ZA–ZC are in the sixth state, the commutation control signals AU–CL are, AU=1, CL=0, CU=0, AL=0, BU=0, CL=1. The switching transistors 4–9 are on with "1" and off with "0". The commutation control signals AU–CL are transmitted from the arithmetic processing unit 26 to the first output register 28.

Figure 5:
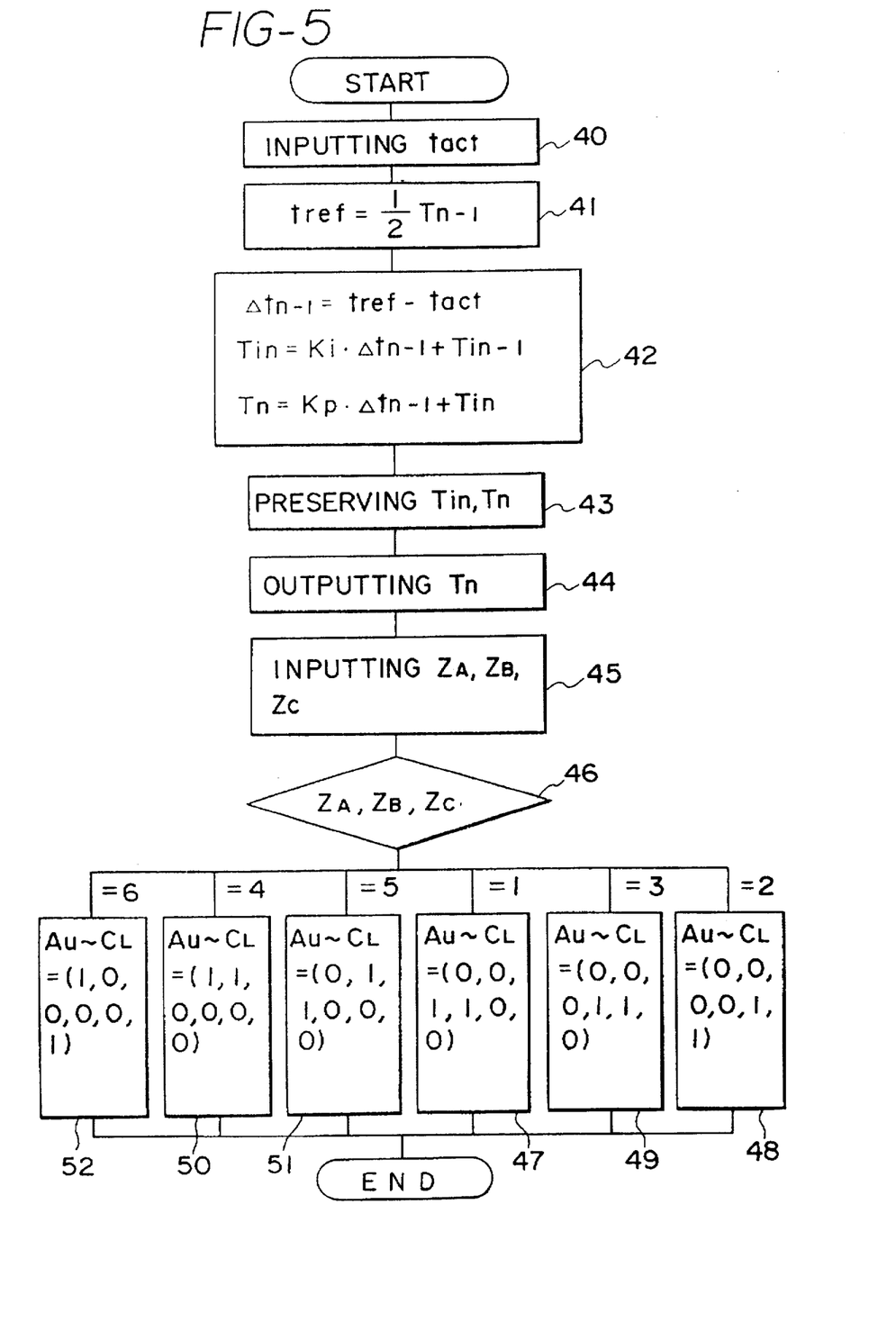
FIG. 5 is a flow chart showing an interruption of an arithmetic processing unit of FIG. 2.

FIG. 5 is a flow diagram showing an interrupt handling operation of the arithmetic processing unit 26 of FIG. 2.

The commutatorless DC motor is started up by synchronized operation, and after it is accelerated to a state under which the induced voltages A–C are stably output, it is switched to an operation by the above-mentioned construction. In the beginning of the switching, a predetermined commutation period is given from the arithmetic processing unit 26 to the second output register 30.

Now, it is supposed that the second output register 30 stores the commutation period Tn=1 and the second counter 35 has finished counting a previous commutation period Tn–2 before the commutation period Tn=1. The second counter 35, when the counting of the previous commutation period Tn–2 is finished, gives the carry-out signal Co to the latch circuit 31, the first counter 33 and its load terminal. The latch circuit 31, when the carry-out signal Co is input, gives new commutation control signals AU–CL which are stored in the first output register 28 to the switching transistors 4–9 to replace prior commutation control signals AU–CL. By this, the driving current of the drive windings 1–3 is commutated. The first counter 33, when the carry-out signal Co is input, clears a prior count value and starts a new time counting. The second counter 35, when the carry-out signal Co is input to the load terminal, disables the carry-out signal Co, and, taking in the new commutation period Tn–1 that is stored in the second output register 30, starts counting thereof.

When the zero-cross pulse signal ZT is generated, the second input register 29 takes in the count value of the first counter 33 as the actual zero-cross time tact, and an interruption is caused in the arithmetic processing unit 26. The arithmetic processing unit 26 takes, in the actual zero-cross time tact from the second input register 29 in the step 40, and sets the reference zero-cross time tref in the step 41. In this embodiment, j=1 and k=2, and the reference zero-cross time, tref=½·Tn–1. In the step 42, first the difference $\Delta t_{n-1}$ of the reference zero-cross time tref and the actual zero-cross time tact is calculated. Following this, the integrated value Tin of the next commutation period Tn is calculated based on the difference $\Delta t_{n-1}$ and the integrated value $T_{in-1}$ of the current commutation period Tn. Then, the next commutation period Tn is calculated based on the difference $\Delta t_{n-1}$ and the integrated value Tin of the next commutation period Tn. In the step 43, the integrated value Tin of the next commutation period Tn and the next commutation period Tn are preserved. The integrated value Tin of the next commutation period Tn is used for deciding a commutation period Tn+1 which follows the next commutation period Tn. In the step 44, the next commutation period Tn is given to the second output register 30. In the step 45, the induced voltage signals ZA–ZC are taken in from the first input register 27. In the step 46, the state of the induced voltage signals ZA–ZC is determined, and one of the steps 47–52 is selected according to the determined state of the induced voltage signals ZA–ZC. In the steps 47–52, the commutation control signals AU–CL are decided, the decided commutation control signals AU–CL are given to the first output register 28, and thereby the interruption is finished. The arithmetic processing unit 26 decides the next commutation period by means of the integral and proportional computations. Hence, the arithmetic processing unit 26 can follow a phase difference even in cases where the difference of the actual zero-cross time and the reference zero-cross time is large, that is where the phase difference is large.

When the second counter 35 has finished counting the current commutation period Tn=1, as mentioned above, the carry-out signal Co is given to the latch circuit 31, the first counter 33 and its load terminal. The latch circuit 31 gives new commutation control signals AU–CL, which were stored in the first output register 28 in the steps 47–52 of FIG. 5, to the switching transistors 4–9. By this, the drive current of the drive windings 1–3 is commutated. The first counter 33 starts counting a new actual zero-cross time tact. The second counter 35 takes in a new commutation period Tn which is stored in the second output register 30, and starts counting.

Figure 6:
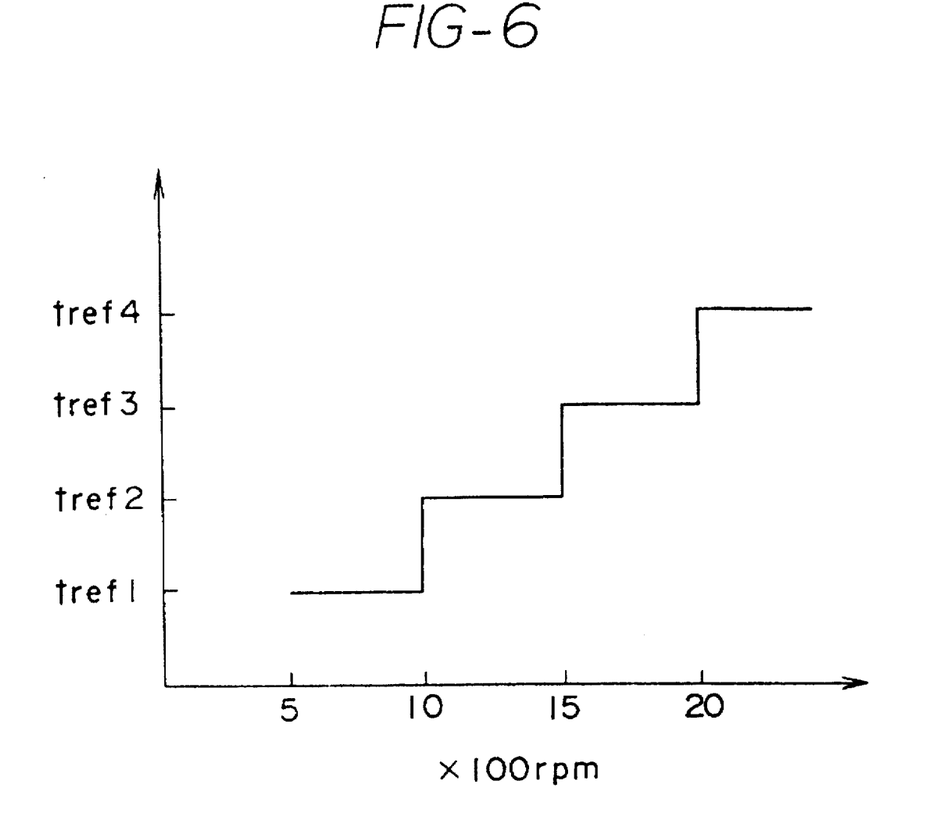
FIG. 6 is a graph for explaining an example of a commutation timing control.

FIG. 6 is an explanatory drawing for explaining an example of commutation timing control. In FIG. 6, a lateral axis represents a revolution of the commutatorless DC motor and a longitudinal axis represents a reference zero-cross time tref. In this example four kinds of zero-cross time tref 1, tref 2, tref 3 and tref 4 are provided. The reference zero-cross time tref 1 to tref 4 are set for different values by changing j and/or k. The reference zero-cross time tref 1 to tref 4 are selected in conjunction with the revolution of the commutatorless DC motor. Thus, commutation timing can be regulated automatically, if the relationship of the revolution and the reference zero-cross time tref 1 to tref 4 are stored in memory and the reference zero-cross time tref 1 to tref 4 are read out according to the revolution.

According to the first embodiment mentioned above, the next commutation period is decided such that the zero-cross pulse signal is generated at the reference zero-cross time by an integration control and a proportion control according to the difference between the reference zero-cross time when the zero-cross pulse signal should be generated and the actual zero-cross time when the zero-cross pulse signal is actually generated. Accordingly, the commutation period is adjusted in proportion to the difference of the actual zero-cross time and the reference zero-cross time itself as well as to the integrated result of the difference of the actual zero-cross time and the reference zero-cross time. Therefore, even in cases where the difference of the actual zero-cross time and the reference zero-cross time is large, that is when a phase difference is large, the first embodiment can follow the phase difference in good response. Moreover, since the reference zero-cross time is set by a time width to the j-th of equally divided k parts of the current commutation period, it is easily possible to change a commutation timing by varying j and/or k.

Figure 7:
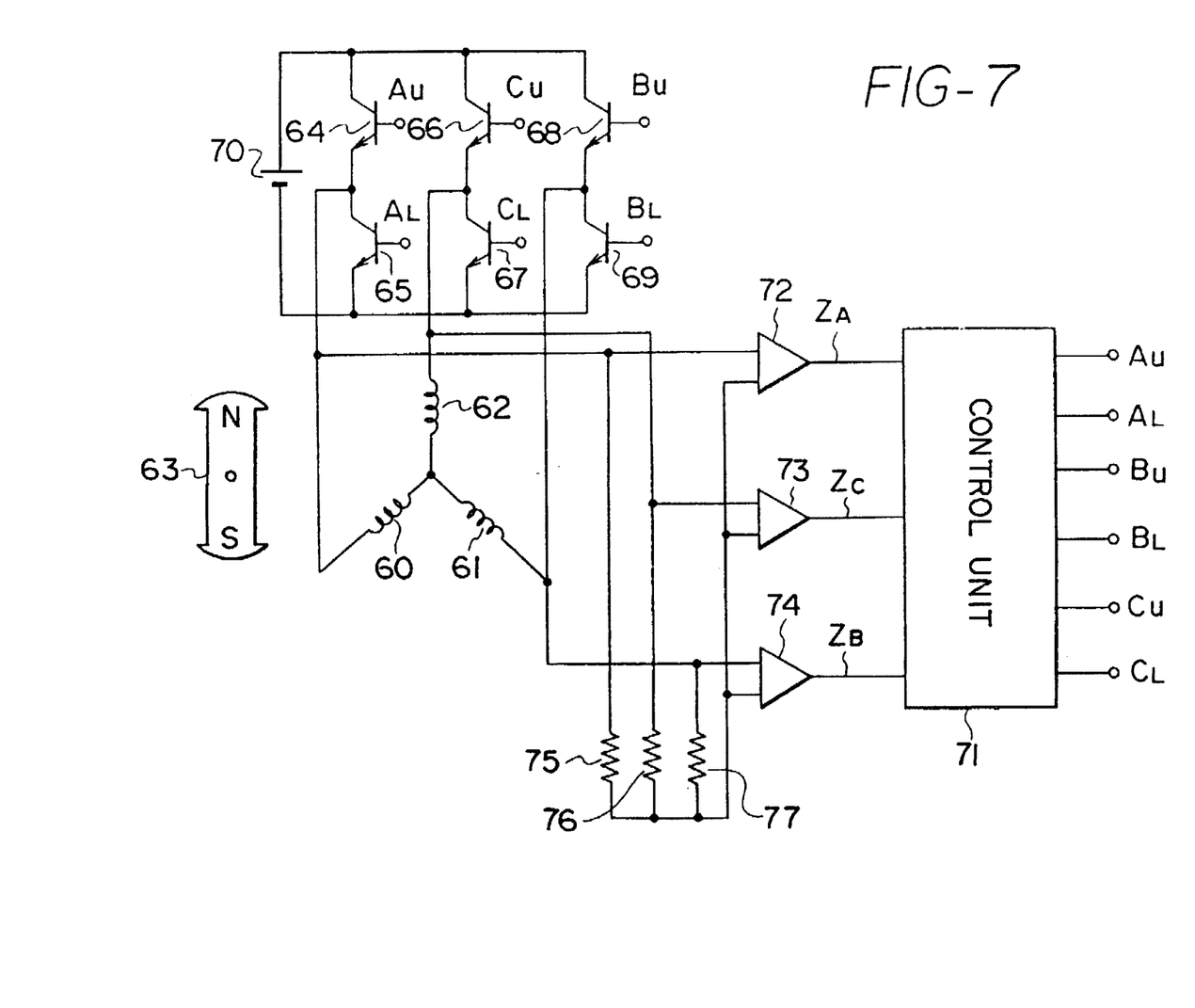
FIG. 7 is a block diagram showing a second embodiment of the present invention.
Figure 8:
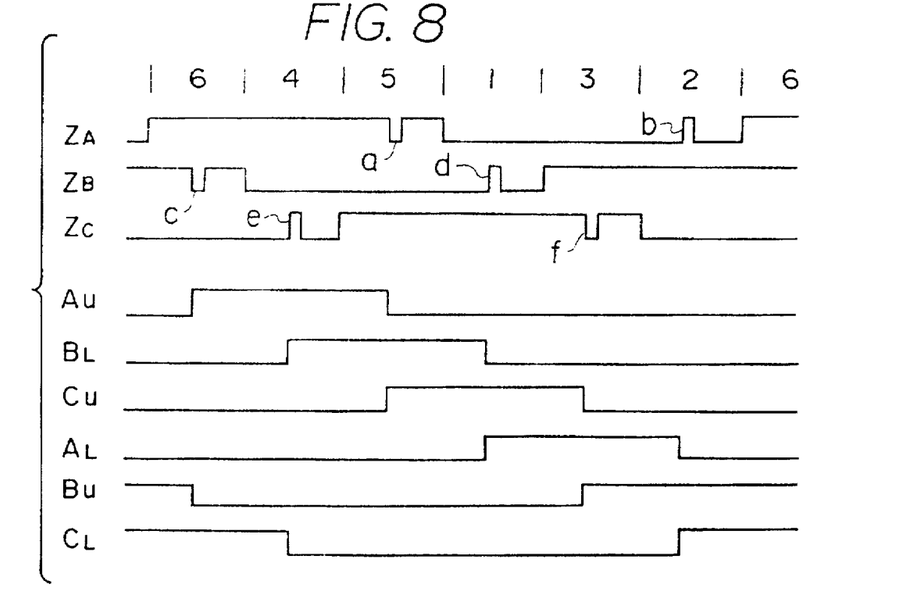
FIG. 8 is a waveform chart illustrating induced voltage signals and commutation control signals in FIG. 7.

FIG. 7 is a block diagram showing a second embodiment of the present invention. FIG. 8 is a waveform chart illustrating induced voltage signals ZA, ZB, ZC and commutation control signals AU, AL, BU, BL, CU, CL shown in FIG. 7.

In FIG. 7, reference numerals 60, 61 and 62 are drive windings of a commutatorless DC motor. The drive windings 60–62 are a three-phase Y connection. The drive windings 60–62 are fixed to the motor. A reference numeral 63 represents a permanent magnet rotor of the commutatorless DC motor. Reference numerals 64, 65, 66, 67, 68 and 69 represent switching transistors for controlling a commutation of driving current of the drive windings 60–62. The switching transistors 64–69 form a three-phase bridge connection, and a power source 70 is impressed to collector-emitter circuits of the three-phase bridge connection. The switching transistors 64–69 at their bases receive the commutation control signals AU–CL. The switching transistors 64–69 are on-off controlled according to the commutation control signals AU–CL, and thereby the driving current of the drive windings 60–62 commutates and the permanent magnet rotor 63 rotates.

When the permanent magnet rotor 63 is rotating, induced voltages are generated in the drive windings 60–62. Reference numerals 72, 73 and 74 indicate comparators. The comparators 72–74 input the induced voltages from the drive windings 60–62 and a neutral point potential, and give the pulse shaped induced voltage signals ZA–ZC to the control unit 71. The neutral point potential is given by resistors 75, 76 and 77 which constitute a virtual neutral point of the drive windings 60–62. The rising and falling edges of the induced voltage signals ZA–ZC represent zero-cross points of induced voltages which are generated in the drive windings 60–62. In the commutatorless DC motor, spike voltages are generated in the drive windings 60–62. The spike voltages are superposed on the induced voltages of the drive windings 60–62. Hence, as shown in FIG. 8, spike voltages a, b, c, d, e, f appear in the induced voltages ZA–ZC. The spike voltage a is generated by switching from the state AU=1, BL=1 to the state BL=1, CU=1. Other spike voltages are also generated likewise by switching the commutation control signals AU–CL.

The control unit 71 has the following functions. The control unit 71 recognizes the last rising or falling edge, as the true rising or falling edge of the induced voltage signals ZA–ZC, among the rising and falling edges of the induced voltage signals ZA–ZC which are given from the comparators 72–73 between a start of current commutation period and an end thereof. The control unit 71 detects a time width between the start of the current commutation period and the true rising or falling edge of the induced voltage signals ZA–ZC as an actual zero-cross time tact. The control unit 71, when no rising or falling edges of the induced voltage signals ZA–ZC are given from the comparators 72–74 from the start to end of the current commutation period, detects the current commutation period as the actual zero-cross time tact. This occurs when a commutation timing is at a leading phase which is more than 30° in conjunction with the induced voltage signals ZA–ZC. The control unit 71 determines a commutation period. A decision on the commutation period is as described in the first embodiment. That is, the control unit 71 sets a reference zero-cross time tref which represents a desirable time until the true rising or falling edge of the induced voltages ZA–ZC should be generated after the start of the current commutation period.

$$t_{ref}=(j/k) \cdot T_{n-1}$$

In the formula mentioned above, (j/k)·Tn−1 represents a time width to the j-th of the equally divided k parts of the current commutation period Tn=1. The control unit 71 calculates a difference Δtn−1 of the reference zero-cross time tref and the actual zero-cross time tact.

$$\Delta t_{n-1}=t_{ref}-t_{act}$$

The control unit 71 calculates an integrated value Tin of a next commutation period based on the difference Δtn−1 and an integrated value Tin−1 of the current commutation period.

$$T_n = K_i \cdot \Delta t_{n-1} + T_{n-1}$$

In the formula mentioned above, $K_i$ is an integration constant. The control unit 71 calculates the next commutation period $T_n$ based on the difference $\Delta t_{n-1}$ and an integrated value $T_{in}$ of the next commutation period.

$$T_n = K_p \cdot \Delta t_{n-1} + T_{in}$$

In the formula mentioned above, $K_p$ is a proportional constant. Moreover, the control unit 71 assigns "0" or "1" to the commutation control signals AU–CL according to the state of the induced voltage signals ZA–ZC. The control unit 71 outputs the assigned commutation control signals AU–CL to switching transistors 64–69 at the next commutation timing.

Figure 9:
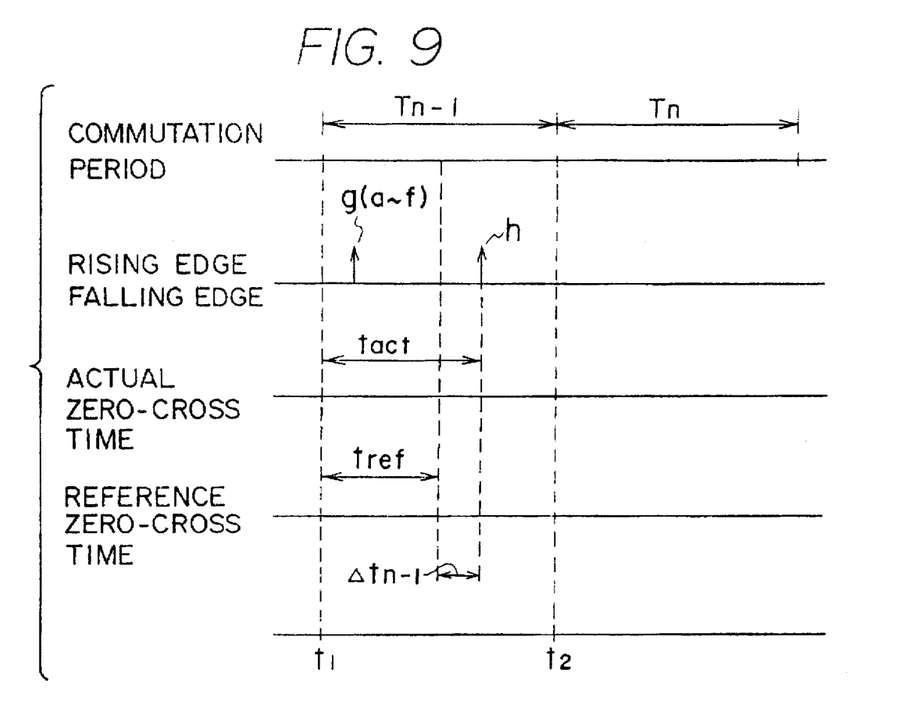
FIG. 9 is a diagram for explaining the decision of a commutation period of a composition of FIG. 7, and FIG. 10 and FIG. 11 are flow charts of a control unit of FIG. 7.

FIG. 9 is an explanatory drawing for explaining the decision of a commutation period. In FIG. 9, a reference alphabet g (a–f) is a spike voltage, and a reference alphabet h is a true rising or falling edge of the induced voltage signals ZA–ZC. In the signals g (a–f) and h which are given from a start point t1 of the current commutation to a start point t2 of the next commutation, the signal h generated at last is decided to be the true rising or falling edge of the induced voltage signals ZA–ZC. The actual zero-cross time tact at which the true rising or falling edge of the induced voltage signals ZA–ZC is actually generated after the start point t1 of the current commutation is detected. The reference zero-cross time tref at which the signal h should be generated is set based on the current commutation period $T_{n-1}$. The difference $\Delta t_{n-1}$ of the reference zero-cross time tref and the actual zero-cross time tact is calculated. The next commutation period $T_n$ is decided based on the difference $\Delta t_{n-1}$ such that the true rising or falling edge h of the induced voltage signals ZA–ZC is generated at the reference zero-cross time tref.

The control unit 71 assigns "0" or "1" to the commutation control signals AU–CL according to the state of the induced voltage signals ZA–ZC. The assignment to the commutation control signals AU–CL is as described in the first embodiment. That is, when the induced voltage signals ZA–ZC in the first state (0, 0, 1), the commutation control signals AU–BL are, AU=0, CL=0, CU=1, AL=1, BU=0, CL=0. When the induced voltage signals ZA–ZC in the second state (0, 1, 0), the commutation control signals AU–CL are, AU=0, CL=0, CU=0, AL=0, BU=1, CL=1. When the induced voltage signals ZA–ZC are in the third state (0, 1, 1), the commutation control signals AU–CL are, AU=0, BL=0, CU=0, AL=1, BU=1, CL=0. When the induced voltage signals ZA–ZC are in the fourth state (1, 0, 0), the commutation control signals AU–CL are, AU=1, CL=1, CU=0, AL=0, BU=0, CL=0. When the induced voltage signals ZA–ZC are in the fifth state (1, 0, 1), the commutation control signals AU–CL are, AU=0, CL=1, CU=1, AL=0, BU=0, CL=0. When the induced voltage signals ZA–ZC are in the sixth state (1, 1, 0), the commutation control signals AU–CL are, AU=1, CL=0, CU=0, AL=0, BU=0, CL=1. The commutation control signals AU–CL are given to the switching transistors 64–69, thereby generating a commutation.

Figure 10:
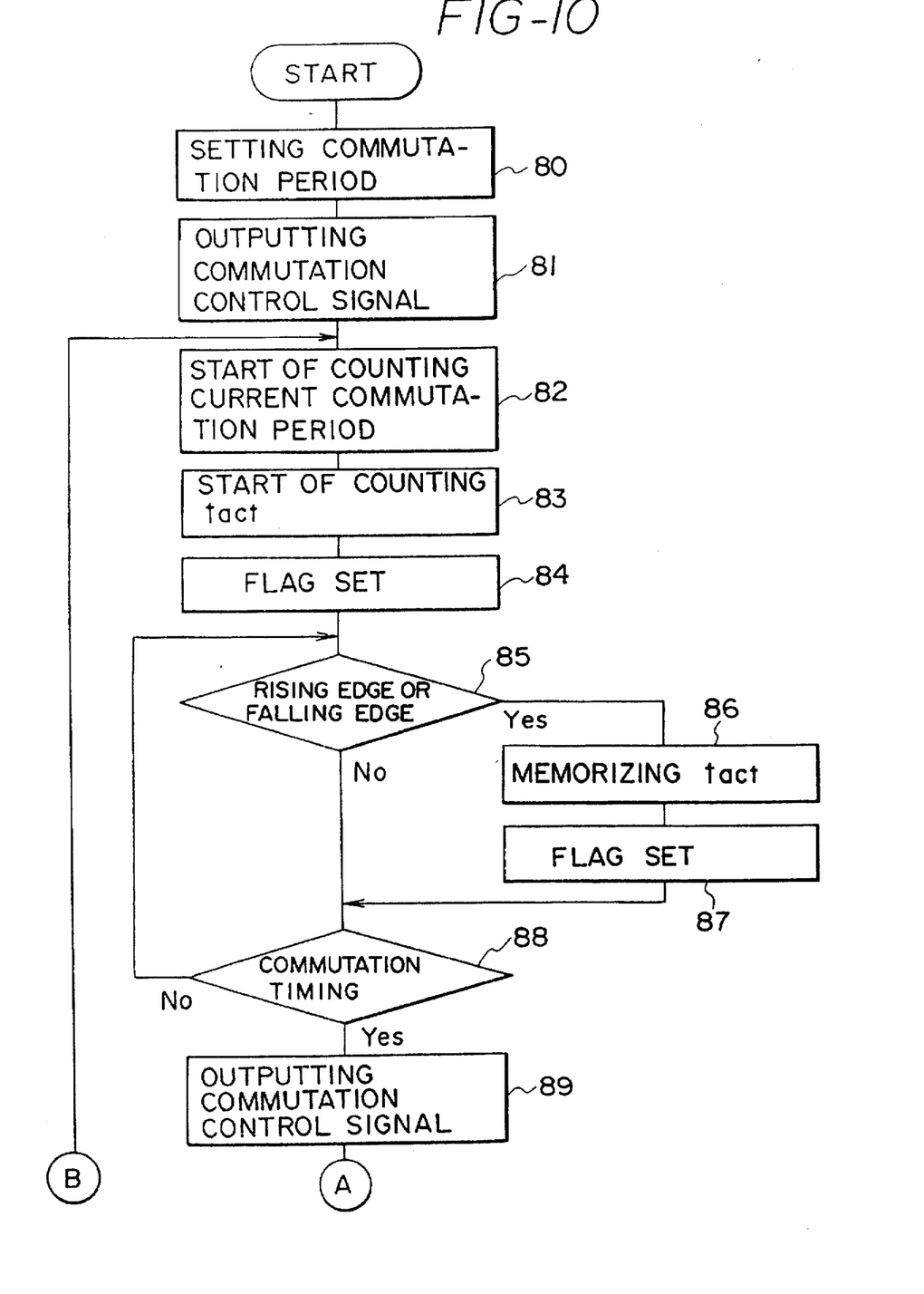
Figure 11:
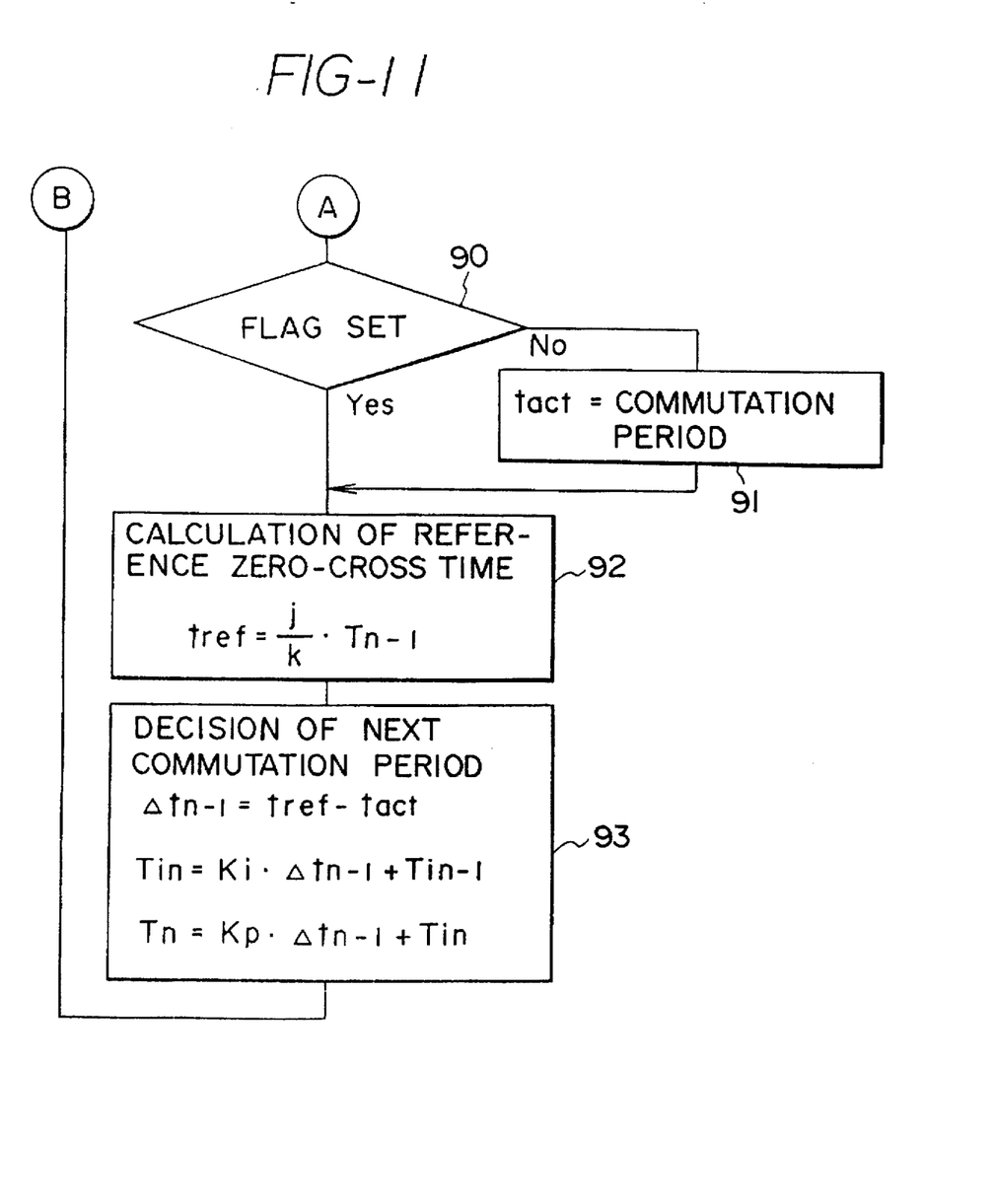

FIG. 10 and FIG. 11 are flow diagrams of the control unit 71 of FIG. 7. Terminals A and B of FIG. 10 are connected to terminals A and B of FIG. 11.

The commutatorless DC motor is started up by synchronized operation, and after being accelerated to a state where induced voltages are stably output, it is switched to an operation by the above-mentioned construction. In the beginning of switching, the control unit 71 sets a prescribed commutation period in the step 80, and gives prescribed commutation control signals AU–CL to the switching transistors 64–69 in the step 81. Hence, a commutation is generated and a running of the motor based on the induced voltage signals ZA–ZC is started.

The control unit 71 starts counting the current commutation period $T_{n-1}$ in the step 82. As described below, when the counting of the current commutation period $T_{n=1}$ is finished, counting of the next commutation period $T_n$ is started. In the step 83, counting of the actual zero-cross time tact is started by reset/start of an internal timer of the control unit 71. In the step 84, a flag which indicates whether a rising or falling edge is generated in the induced voltage signals ZA–ZC is reset. In the step 85, whether a rising or falling edge is generated in the induced voltage signals ZA–ZC is determined. If the spike voltage g (a–f) is generated, a rising or falling edge is generated in the induced voltage signals ZA–ZC by the spike voltage g (a–f). Since the spike voltage g (a–f) is generated when switching a driving current of the drive windings 60–62, the generation of the spike voltage g (a–f) is ahead of the true rising or falling edge h of the induced voltage signals ZA–ZC. The control unit 71 detects the spike voltage g (a–f) and goes from the step 85 to the step 86. In the step 86, a count value when the spike voltage g (a–f) is generated is taken in from the internal timer, and it is memorized as the zero-cross time tact. This count value is a time width between the start of the current commutation period and the generation of the spike voltage g (a–f). As described below, when the true rising or falling edge h of the induced voltage signals ZA–ZC is generated, this count value is updated to a count value which represents a time width between the start of the current commutation period and the generation of the true rising or falling edge h of the induced voltage signals ZA–ZC. The internal timer continues its time counting. In the step 87, the flag which indicates whether a rising or falling edge is generated in the induced voltage signals ZA–ZC is set, and in the step 88, whether a commutation timing is reached is determined. A counting end of the current commutation period $T_{n-1}$ is the commutation timing. If the counting of the current commutation period $T_{n-1}$ is not finished yet, the control unit 71 returns from the step 88 to the step 85. In the step 85, if no rising or falling edge is generated in the induced voltage signals ZA–ZC, the control unit 71 immediately goes to the step 88.

When the true rising or falling edge h of the induced voltage signals ZA–ZC is generated after the spike voltage g (a–f), the control unit 71 goes from the step 85 to the step 86. In the step 86, a count value when the true rising or falling edge h of the induced voltage signals ZA–ZC is generated is taken in from the internal timer, and instead of the previous actual zero-cross time tact, this count value is memorized as the actual zero-cross time tact. The true rising or falling edge h of the induced voltage signals ZA–ZC is generated after the spike voltage g (a–f). Therefore, the actual zero-cross time tact which is finally left represents a time width from the start of the current commutation to the generation of the true rising or falling edge h of the induced voltage signals ZA–ZC.

The control unit 71, when determining a commutation timing in the step 88, enters the step 89. In the step 89, "0" or "1" is assigned to the commutation control signals AU–CL according to the current state of the induced voltage signals ZA–ZC, and these commutation control signals AU–CL are given to the switching transistors 64–69. Hence, a new commutation is generated. In the step 90 following the step 89, whether the flag is set is determined. If the flag is not set, in the step 91, the current commutation period is memorized as the actual zero-cross time tact. This occurs when a commutation timing is at a leading phase of more than 30° with respect to the induced voltage signals Z_A–Z_C. Then, the control unit 71 proceeds to the decision of the next commutation period Tn in steps 92 and 93. In the step 90, if the flag is set, the control unit 71 immediately goes from the step 90 to the steps 92 and 93. In the step 92, the reference zero-cross time tref is set. In the step 93, the difference $\Delta tn-1$ of the reference zero-cross time tref and the actual zero-cross time tact is calculated, the integrated value Tin of the next commutation period Tn is calculated based on the difference $\Delta tn-1$ and the integrated value Tin-1 of the current commutation period Tn=1, and the next commutation period Tn is decided based on the difference $\Delta tn-1$ and the integrated value Tin of the next commutation period Tn. Then, the control unit 71 returns to the step 82 and starts counting the next commutation period Tn.

According to the second embodiment described above, a rising or falling edge that is generated at last is recognized as the true rising or falling edge, and a time width from the start of the current commutation period to the true rising or falling edge of the induced voltage signals is determined to be the actual zero-cross time. The spike voltage is generated prior to the true rising or falling edge of the induced voltage signals. Therefore, it is possible to detect the time width to the true rising or falling edge of the induced voltage signals as the actual zero-cross time, without being affected by the spike voltage. Therefore, according to the second embodiment, if no rising or falling edge of the induced voltage signals is generated from the start to the end of the current commutation period, the current commutation period is set as the actual zero-cross time. Therefore, even when there is a big phase difference between the induced voltage signals and a commutation timing, the motor can continue its rotation.

From foregoing it will now be apparent that a new and improved driving apparatus for a commutatorless DC motor has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A driving apparatus for a commutatorless DC motor, having drive windings of a three-phase Y connection and switching means for commutating a driving current of said drive windings, and giving commutation control signals for on-off controlling said switching means based on induced voltages which are generated at each phase of said drive windings, comprising:

signal generating means, responsive to said induced voltages, for generating pulse-shaped induced voltage signals based on a comparison of said induced voltages and a neutral point potential of said drive windings;

commutation period counting means for counting a current commutation period, said commutation period counting means starting a counting of a next commutation period, when a counting of the current commutation period is finished;

actual zero-cross time detecting means, responsive to said signal generating means and said commutation period counting means, for detecting an actual zero-cross time which represents an actual time width from a start of the current commutation period till a generation of a rising or falling edge of said induced voltage signals;

reference zero-cross time setting means, responsive to said signal generating means, for setting a reference zero-cross time which represents a desirable time width from the start of the current commutation period until a rising or falling edge of said induced voltage signals which should be generated;

commutation period deciding means, responsive to said actual zero-cross time detecting means and said reference zero-cross time setting means, for deciding the next commutation period based on a difference of said reference zero-cross time and said actual zero-cross time, said commutation period deciding means calculating an integrated value of said next commutation period, and deciding said next commutation period by a proportional computation based on said difference and the integrated value of said next commutation period; and commutation control signal supplying means, responsive to said signal generating means and said commutation period counting means, for deciding new commutation control signals corresponding to a state of said induced voltage signals, and outputting said new commutation control signals to said switching means when the counting of the current commutation period is finished.

2. The apparatus as claimed in claim 1, wherein said reference zero-cross time setting means sets the reference zero-cross time according to the following calculation formula:

$$tref=(j/k)\cdot Tn-1$$

where tref is said reference zero-cross time, and $(j/k)\cdot Tn-1$ is a time width to the j-th of the equally divided k parts of the current commutation period Tn-1.

3. The apparatus as claimed in claim 1, wherein said commutation period deciding means decides the next commutation period according to the following calculation formulas:

$$\Delta tn-1=tref-tact$$

$$Tin=Ki\cdot \Delta tn-1+Tin-1$$

$$Tn=Kp\cdot \Delta tn-1+Tin$$

where, $\Delta tn-1$ is said difference of said reference zero-cross time tref and said actual zero-cross time tact, Tin is the integrated value of said next commutation period, Ki is an integration constant, Tin-1 is the integrated value of said current commutation period, Tn is said next commutation period, and Kp is a proportional constant.

4. The apparatus as claimed in claim 1, wherein said commutation control signal supplying means includes:

determining means for determining the state of said induced voltage signals, said induced voltage signals having a first state to a sixth state, and said determining means determining which of the first to sixth states said induced voltage signals are in; and outputting means having first to sixth groups of said commutation control signals which correspond to the first to sixth states of said induced voltage signals, said output means, responsive to said determining means, outputting corresponding one group of said commutation control signals.

5. The apparatus as claimed in claim 1, wherein said signal generating means includes zero-cross pulse generating means for generating a zero-cross pulse signal which represents the rising and falling edges of said induced voltage signals, said actual zero-cross time detecting means and said reference zero-cross time setting means responding to said zero-cross pulse signal.

6. The driving apparatus as claimed in claim 1, wherein said commutation period deciding means decides the next commutation period such that the rising or falling edge of said induced voltage signals is generated at said reference zero-cross time.

7. The driving apparatus as claimed in claim 1, wherein said commutation period deciding means calculates the integrated value of said next commutation period by an integral computation based on said difference and an integrated value of said current commutation period.

8. A driving apparatus for a commutatorless DC motor, having drive windings of a three-phase Y connection and switching means for commutating a driving current of said drive windings, and giving commutation control signals for on-off controlling said switching means based on induced voltages which are generated at each phase of said drive windings, comprising:

signal generating means, responsive to said induced voltages, for generating pulse-shaped induced voltage signals based on a comparison of said induced voltages and a neutral point potential of said driving windings;

commutation period counting means for counting a current commutation period, and a next commutation period when counting of the current commutation period is finished;

actual zero-cross time detecting means, responsive to said signal generating means and said commutation period counting means, for recognizing a last rising or falling edge of said induced voltage signals generated during the current commutation period as a true rising or falling edge of said induced voltage signals, and detecting a time width between the start of said current commutation period and the true rising or falling edge as an actual zero-cross time;

reference zero-cross time setting means, responsive to said signal generating means, for setting a reference zero-cross time which represents a desirable time width from the start of the current commutation period until the true rising or falling edge of said induced voltage signals should be generated;

commutation period deciding means, responsive to said actual zero-cross time detecting means and said reference zero-cross time setting means, for deciding the next commutation period based on a difference of said reference zero-cross time and said actual zero-cross time and based on an integrated value of said next commutation period; and commutation control signal supplying means, responsive to said signal generating means and said commutation period counting means, for outputting new commutation control signals corresponding to a state of said induced voltage signals.

9. The apparatus as claimed in claim 8, wherein said zero-cross time detecting means comprises:

rising/falling detecting means, responsive to said signal generating means and said commutation period counting means, for detecting rising and falling edges of said induced voltage signals which are generated during the commutation period; and memory means, responsive to said rising/falling detecting means and said commutation period counting means, for memorizing a time width from the start of the current commutation period to a rising or falling edge of said induced voltage signals as the actual zero-cross time each time said rising/falling detecting means detects the rising or falling edge of said induced voltage signals, said memory means, when a new rising or falling edge of said induced voltage signals is detected, updating the memorized actual zero-cross time with a new time width determined from the start of the current commutation period to the new rising or falling edge detected, and preserving a memorized time width as the actual zero-cross time when said last rising or falling edge in the current commutation period is detected.

10. The apparatus as claimed in claim 8, wherein said zero-cross time detecting means, when no rising or falling edges of said induced voltage signals are generated from the start to end of the current commutation period, outputs the current commutation period as said actual zero-cross time.

11. The apparatus as claimed in claims 8, wherein said reference zero-cross time setting means sets the references zero-cross time according to the following calculation formula:

$$t_{ref} = (j/k) \cdot T_{n-1}$$

where $t_{ref}$ is said reference zero-cross time, and $(j/k) \cdot T_{n-1}$ is a time width to the j-th of the equally divided k parts of the current commutation period $T_{n-1}$.

12. The apparatus as claimed in claim 8, wherein said commutation period deciding means decides the next commutation period according to the following calculation formulas:

$$\Delta t_{n-1} = t_{ref} - t_{act}$$

$$T_{in} = K_i \cdot \Delta t_{n-1} + T_{in-1}$$

$$T_n = K_p \cdot \Delta t_{n-1} + T_{in}$$

where $\Delta t_{n-1}$ is said difference of said reference zero-cross time $t_{ref}$ and said actual zero-cross time $t_{act}$, $T_{in}$ is the integrated value of said next commutation period, $K_i$ is an integration constant, $T_{in-1}$ is the integrated value of said current commutation period, $T_n$ is said next commutation period, and $K_p$ is a proportional constant.

13. The apparatus as claimed in claim 8, wherein said commutation control signal supplying means includes:

determining means for determining the state of said induced voltage signals, said induced voltage signals having a first state to a sixth state, said determining means determining which of the first to sixth states said induced voltage signals are in; and outputting means having first to sixth groups of said commutation control signals which correspond to the first to sixth states of said induced voltage signals, said outputting means, responsive to said determining means, outputting corresponding one group of said commutation control signals.

14. The driving apparatus as claimed in claim 8, wherein said commutation period deciding means decides the next commutation period such that the rising or falling edge of said induced voltage signals is generated by said reference zero-cross time.

15. The driving apparatus as claimed in claim 8, wherein said commutation period deciding means calculates the integrated value of said next commutation period by an integral computation based on said difference and an integrated value of said commutation period, and decides said next commutation period by a proportional computation based on said difference and the integrated value of said next commutation period.

16. A driving apparatus for a commutatorless DC motor, having drive windings and switching means for commutating a driving current of said drive windings, comprising:

signal generating means, responsive to induced voltages of the drive windings, for generating pulse-shaped induced voltage signals based on a comparison of said induced voltages and a neutral point potential of said drive windings;

recognizing means, responsive to said signal generating means, for recognizing a last rising or falling edge of said induced voltage signals generated during a current commutation period as a true rising or falling edge of said induced voltage signals, and detecting a time width between a start of said current commutation period and the true rising or falling edge as an actual zero-cross time, said recognizing means including:

- detecting means, responsive to said signal generating means, for detecting a rising or falling edge of said induced voltage signals generated during the current commutation period, and
- memory means, responsive to said detecting means, for memorizing a time width from the start of the current commutation period to the detected rising or falling edge of said induced voltage signals as the actual zero-cross time each time said detecting means detects the rising or falling edge of said induced voltage signals, said memory means, when a new rising or falling edge is detected, updating the memorized actual zero-cross time with a new time width determined from the start of the current commutation period to the new rising or falling edge detected, and preserving a memorized time width as the actual zero-cross time when said last rising or falling edge in the current commutation period is detected; and driving means, responsive to said recognizing means, for generating commutation control signals for controlling the switching means based on the actual zero-cross time detected by said recognizing means.

17. The driving apparatus of claim 16, wherein said driving means determines a reference zero-cross time based on the current commutation period, computes a next commutation period based on said actual zero-cross time and said reference zero-cross time, and generates the commutation control signals based on the computed next commutation period.

18. The driving apparatus of claim 16, wherein when no rising or falling edge of said induced voltage signals is detected during the current commutation period, said recognizing means determines the current commutation period as said actual zero-cross time.

19. The driving apparatus of claim 16, wherein said driving means calculates said next commutation period by calculating a difference between said actual zero-cross time and a reference zero-cross time and an integrated value of said next commutation period.

* * * * *